United States Patent
Tamir et al.

(10) Patent No.: US 10,929,458 B2
(45) Date of Patent: Feb. 23, 2021

(54) AUTOMATED PRESENTATION CONTROL

(71) Applicant: Microsoft Technology Licensing, LLC, Redmond, WA (US)

(72) Inventors: Gal Tamir, Avichayil (IL); Rachel Lemberg, Herzliya (IL); Ze'ev Maor, Haifa (IL); Ori Bar-Ilan, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 15/950,843

(22) Filed: Apr. 11, 2018

(65) Prior Publication Data

US 2019/0318010 A1    Oct. 17, 2019

(51) Int. Cl.
| | |
|---|---|
| G06F 16/438 | (2019.01) |
| G06F 3/16 | (2006.01) |
| G06F 40/30 | (2020.01) |
| G10L 15/07 | (2013.01) |
| G10L 15/26 | (2006.01) |
| G10L 15/22 | (2006.01) |

(52) U.S. Cl.
CPC .......... *G06F 16/4393* (2019.01); *G06F 3/167* (2013.01); *G06F 40/30* (2020.01); *G10L 15/07* (2013.01); *G10L 15/26* (2013.01); *G10L 2015/228* (2013.01)

(58) Field of Classification Search
CPC .. G06F 16/4395; G06F 3/167; G06F 17/2785; G06F 16/4393
See application file for complete search history.

(56) References Cited

U.S. PATENT DOCUMENTS

| | | | |
|---|---|---|---|
| 5,199,080 A | 3/1993 | Kimura et al. | |
| 6,272,461 B1 | 8/2001 | Meredith et al. | |
| 6,968,506 B2 * | 11/2005 | Yacovone | G06F 16/41 715/730 |

(Continued)

OTHER PUBLICATIONS

Anderson, et al., "Speech, Ink, and Slides: The Interaction of Content Channels", In Proceedings of the 12th annual ACM international conference on Multimedia, Oct. 10, 2004, 8 Pages.

(Continued)

*Primary Examiner* — Stephen S Hong
*Assistant Examiner* — Nicholas Hasty (57) ABSTRACT

Non-limiting examples of the present disclosure relate to automated presentation control during presentation of one or more digital documents. Processing operations described herein may be configured to work with any type of application/service, where examples described herein extend to presentation of any type of digital document(s) including slide-based presentations. Speech signals may be detected while a digital document is being presented. The detected speech signals may be converted to text. The converted text may be matched with contextual data (e.g., pre-processed content) associated with the digital document. Probability scoring for determination of a next placement position of a digital document may be generated based on the matching of converted text with the contextual data of the digital document. The next placement position may be selected based on the generated probability scoring. Display of the digital document may be automatically updated to reflect the selected next placement position.

20 Claims, 7 Drawing Sheets

(56) References Cited

U.S. PATENT DOCUMENTS

| | | | |
|---|---|---|---|
| 7,206,773 B2* | 4/2007 | Erol | G06Q 10/10 |
| 2005/0021343 A1 | 1/2005 | Spencer | |
| 2007/0283270 A1 | 12/2007 | Sand et al. | |
| 2014/0019121 A1 | 1/2014 | Bao et al. | |
| 2015/0132735 A1* | 5/2015 | Edge | G06Q 10/10 434/308 |
| 2015/0178044 A1* | 6/2015 | Ehlen | G06F 3/0482 715/728 |
| 2016/0246819 A1 | 8/2016 | Cosic | |

OTHER PUBLICATIONS

Kim, et al., "Presentation Interface Based on Gesture and Voice Recognition", In Journal of Multimedia and Ubiquitous Engineering, Apr. 16, 2014, pp. 75-76.

Kumar, et al., "Automatic Slide Navigator by Voice Commands Using Microcontroller", In International Journal of Research in Computer and Communication, vol. 1, Issue 4, Sep. 2012, pp. 118-121.

Zhao, Li, "Gesture Control Technology: An investigation on the potential use in Higher Education", Retrieved From <<https://intranet.birmingham.ac.uk/it/innovation/documents/public/Gesture-Control-Technology.pdf>>, Mar. 2016, pp. 1-10.

Franklin, et al., "Beyond Next Slide, Please: The use of Content and Speech in Multi-Modal Control", In Working Notes of the AAAI-99 Workshop on Intelligent Information Systems, Nov. 1, 1999, 7 Pages.

"International Search Report and Written Opinion Issued in PCT Application No. PCT/US2019/024720", dated Jul. 19, 2019, 13 Pages.

\* cited by examiner

AUTOMATED PRESENTATION CONTROL

BACKGROUND

Today, a presenter needs to manually control the synchronization between presentation's slides and its speech. There are different electronic apparatuses that may be used to control the flow of a presentation such as: a keyboard, a mouse, a dedicated clicker (wired or wireless), etc. However, usage of such electronic apparatuses requires attention from the presenters, limits the presenters to physically use one hand for the controller (e.g., "clicker") and often leads to technical issues. Attempts to manually control a presentation through such electronic apparatuses may lead to problems such as interruptions, technical malfunctions (of computing devices or associated electronic apparatuses) as well as ruin a flow of the presentation.

Other technical advances enable applications/services (e.g., digital assistant) to utilize voice commands to synchronize a presentation with speech of a presenter. However, such applications/services typically require users to manually provide commands for presentation control (e.g., next slide), which limits the productivity and efficiency of such applications/services as well as interrupts the flow of the presentation. For instance, a user is required to take action to initiate a digital assistant service to recognize a voice command. Additionally, voice command libraries are typically limited and may not be programmable to include contextually relevant content that is tailored for specific presentations.

SUMMARY

In view of the foregoing technical shortcomings, non-limiting examples of the present disclosure relate to automated presentation control during presentation of one or more digital documents. Flow control of a digital document is automated on behalf of a user to replace manual action typically required for positional placement update of a digital presentation. Automated presentation control is enabled through contextual evaluation of user speech signals. Processing operations described herein may be configured to work with any type of application/service, where examples described herein extend to presentation of any type of digital document(s) including slide-based presentations.

In examples, speech signals may be detected while a digital document is being presented. Presentation of a digital document (or multiple digital documents) is intended to comprise instances where: 1) a digital document is being accessed through an application/service; 2) a training mode for trial presentation of a digital document is executing through an application/service; and 3) a digital document is being presented in a presentation mode through an application/service. In any example, detected speech signals may be converted to text and analyzed. The converted text may be matched with contextual data (e.g., pre-processed content) associated with the digital document (or other digital documents). Probability scoring for determination of a next placement position of the digital document may be generated based on the matching of converted text with the contextual data. The next placement position may be selected based on the generated probability scoring. A display of the digital document may be automatically updated to reflect the selected next placement position, providing automated presentation control on behalf of a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Non-limiting examples of the present disclosure relate to automated presentation control during presentation of one or more digital documents. Flow control of a digital document is automated on behalf of a user to replace manual action typically required for positional placement update of a digital presentation. Automated presentation control is enabled through contextual evaluation of user speech signals. Processing operations described herein may be configured to work with any type of application/service, where examples described herein extend to presentation of any type of digital document(s) including slide-based presentations. Presentation of a digital document (or multiple digital documents) is intended to comprise instances where: 1) a digital document is being accessed through an application/service; 2) a training mode for trial presentation of a digital document is executing through an application/service; and 3) a digital document is being presented in a presentation mode through an application/service.

For ease of explanation, examples described herein may reference contextual analysis and automated control of a single digital document. However, it is to be further understood that processing operations described herein relate to presentation control of not only a single digital document but may also extend to presentation control (e.g., selection of placement positions) across different digital documents as well as cross-application/service examples. For instance, a user may have multiple digital documents open for a presentation and be switching between the digital documents during presentation, where contextual analysis of speech by a presenter may determine to select a placement position from a different digital document that is being prominently displayed during a presentation. In another instance, a presenter may have a digital document open, where contextual analysis of a speech signal indicates that a user is referencing another digital document, for example, that is stored (locally or over a distributed storage associated with an executing service) but not being accessed. In that instance, selection of a placement position may comprise accessing and presenting that digital document on behalf of a user, for example, to assist a presenter with flow of the presentation as well as enhance productivity and processing efficiency of computing devices and applications/services that are used to retrieve a digital document.

Examples described herein include those in which a presentation is being accessed in real-time (or near real-time). In some instances, applications/services may enable a user to execute a training run for presentation of digital document(s), for example, where a training mode may be used to model speech of a training/trial run (or runs) for subsequent live presentation. This may assist real-time processing of speech signals, where probabilistic determinations as to positional placement during a presentation may have a basis on the training runs that were previously executed. During real-time processing, a presenter may use similar language, change sentences, skip sentences, etc., where natural language processing is able to correlate received speech with that which was previously processed and analyzed during training. In other instances contextual analysis of speech signals for determining a placement position within a digital document during a presentation may comprise analyzing one or more of: timestamp data, keywords or voice commands, metadata associated with a digital presentation document, content of the digital presentation document including notes/note items associated with portions of the digital document, categorical classification/entity data and signal data collected from an interaction with a user interface (e.g., positioning of a mouse device or pointer), among other examples. Such contextual analysis may occur in real-time examples including those in which a training run has not previously been recorded. Execution of training runs may yield trained speech that is usable to enhance precision, accuracy and efficiency during generation of probabilistic scoring to select a next placement position within a digital document.

In one example, a digital document is being presented in a user interface of an application/service. For instance, a presentation mode of an application/service may be a trigger for detecting speech signals that may be analyzed to determine a context for presentation of the digital document. A presentation mode may be a user interface mode that is configured for presentation of a digital document as opposed to instances where a digital document is just being accessed through a user interface of an application/service. However, examples described herein are no limited to a specific mode of an application/service. In other examples, an application/service may be configured to enable a user to execute a training mode for presentation of a digital document. An exemplary training mode may enable a user to execute training/trial runs for presentation of a digital document. During execution of a training run of a presentation, training speech may be generated and utilized for model training to enhance speech recognition and contextual analysis of user speech signals during a subsequent live presentation of a digital document.

In other examples, an application/service may be configured to automatically detect speech signals at any point in time while the application/service is executing. It is noted that capture of speech signals may occur in accordance with any privacy laws and regulations and in accordance with user consent. Captured speech signals may be converted to text and subsequently analyzed by a language understanding service (e.g., employing a machine-learning model for natural language understanding). In one instance, an exemplary language understanding service is configured to match the converted text with contextual data associated with a digital document (or other digital documents). In some examples, content associated with the digital document may be pre-processed, for example, to enhance processing efficiency and reduce latency during real-time processing. An exemplary language processing model, employed by the language understanding service, is configured to generate probability scoring for determination of a next placement position of a presentation (within the digital document or another digital document). A next placement position is a point of reference within a digital document where a focus of the digital document may be re-located. A next placement position (e.g., another digital document, next page, next slide, four slides prior, 3 slides ahead) is selected based on the generated probability scoring. Through a user interface of an exemplary application/service, a display of the digital document may be automatically updated to the selected placement position, providing automated presentation control on behalf of a user.

Exemplary technical advantages provided by processing described in the present disclosure including but are not limited to: automated presentation (flow) control of digital documents on behalf of a user; improved applications/services through an adapted user interface that enables automated presentation control for presentation of digital documents; achieving, through the adapted user interface, improved user interaction and productivity for users working with digital documents including presentation of digital documents; adaptation of a language understanding model for contextual analysis of converted text with content associated with digital documents and generation of probability scoring for determination of a next placement position for a presentation; improved processing efficiency for computing devices including reduced processing load during presentation of digital documents and reduced latency in data retrieval and presentation; improvements during operation of computing devices directed to processing efficiency (reduction in processing cycles) and better management of computer storage/memory during presentation control of digital documents; cross-application/service enhancement through proactive data retrieval and analysis that replaces manual user action; and improved system/service examples that extend capabilities and functionality of associated applications/services, among other technical advantages.

Figure 1:
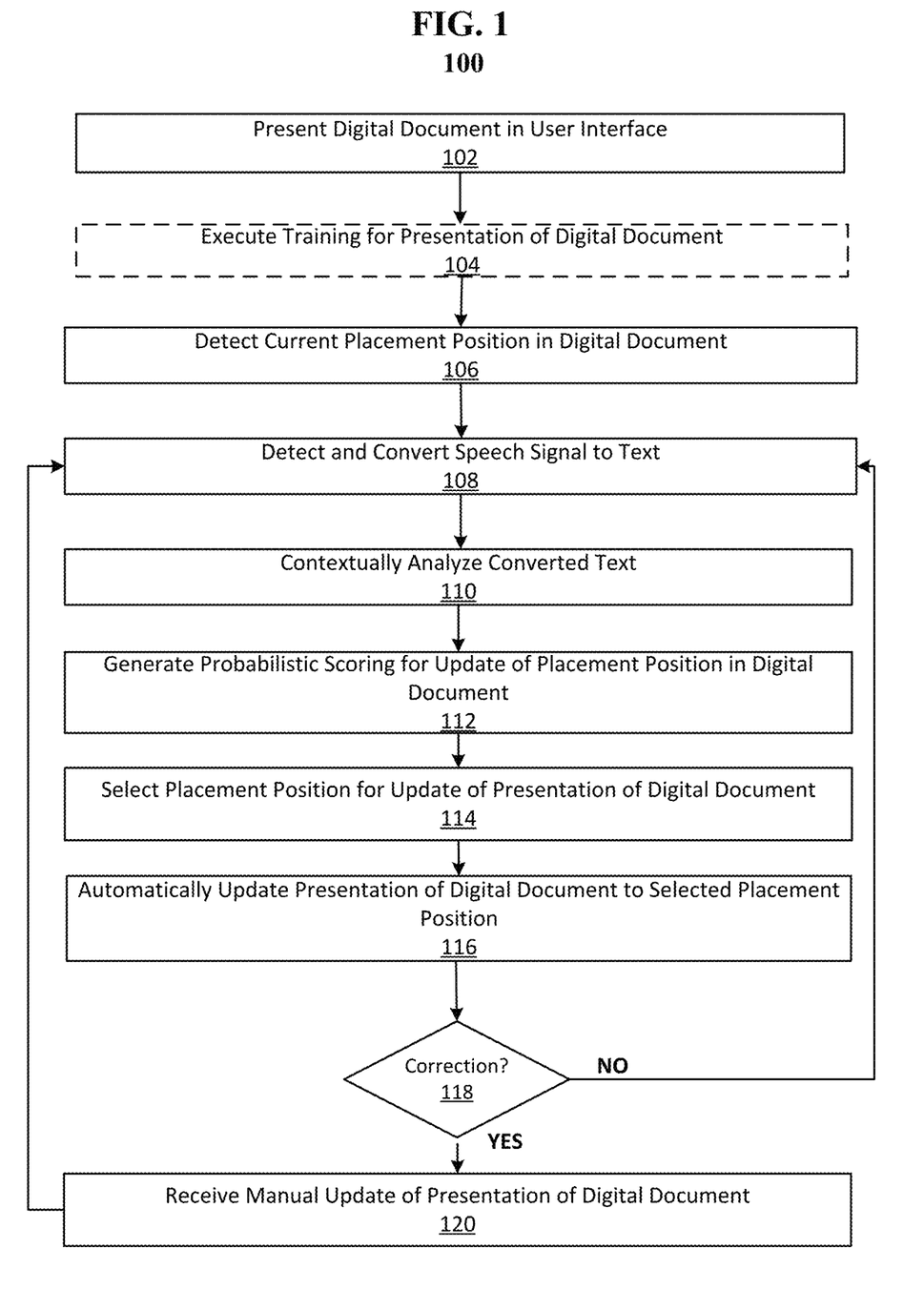
FIG. 1 illustrates an exemplary method related to automated presentation control, with which aspects of the present disclosure may be practiced.

FIG. 1 illustrates an exemplary method 100 related to automated presentation control, with which aspects of the present disclosure may be practiced. Automated presentation control pertains to examples where speech signals are analyzed and associated with a digital document including examples where a digital document is being presented in a presentation mode of an application/service. Presentation of a digital document includes examples where: a digital document is open/active on a computing device and being discussed based on analysis of speech signals; examples where a digital document is being presented in a presentation mode of an application/service; and further extending to examples where a digital document is stored (and not actively accessed) but being discussed based on analysis of speech signals. Language understanding processing as well as user interface features for automated presentation control (including toggling of training and live presentations mode)

may be natively integrated within applications/services that are used to access digital documents.

Figure 3:
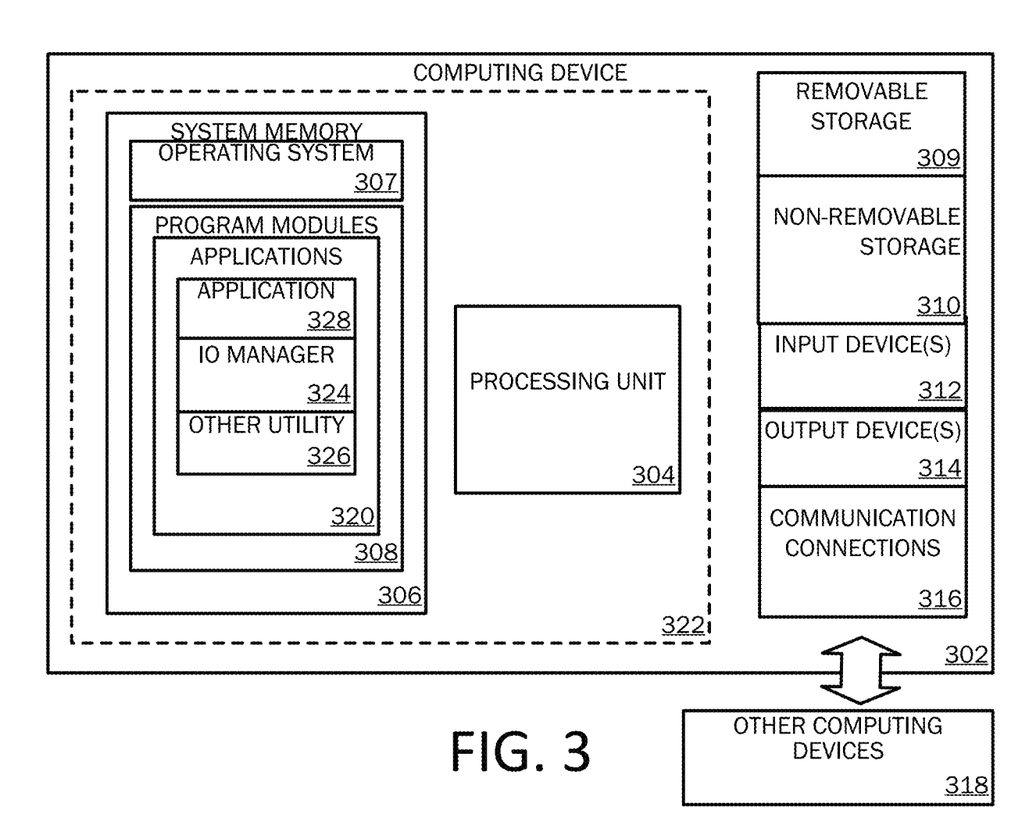
FIG. 3 is a block diagram illustrating an example of a computing device with which aspects of the present disclosure may be practiced.
Figure 4A:
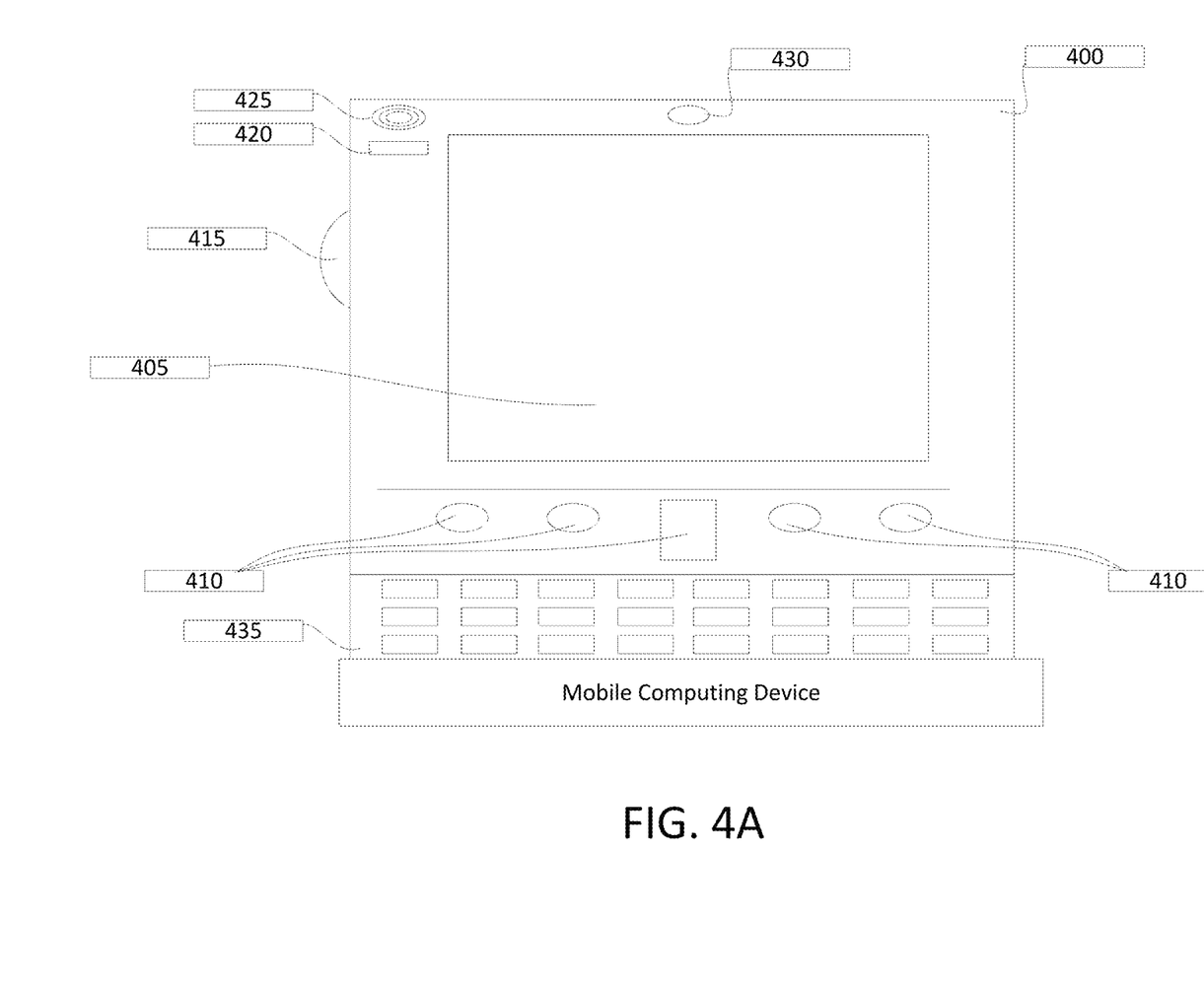
FIGS. 4A and 4B are simplified block diagrams of a mobile computing device with which aspects of the present disclosure may be practiced.
Figure 4B:
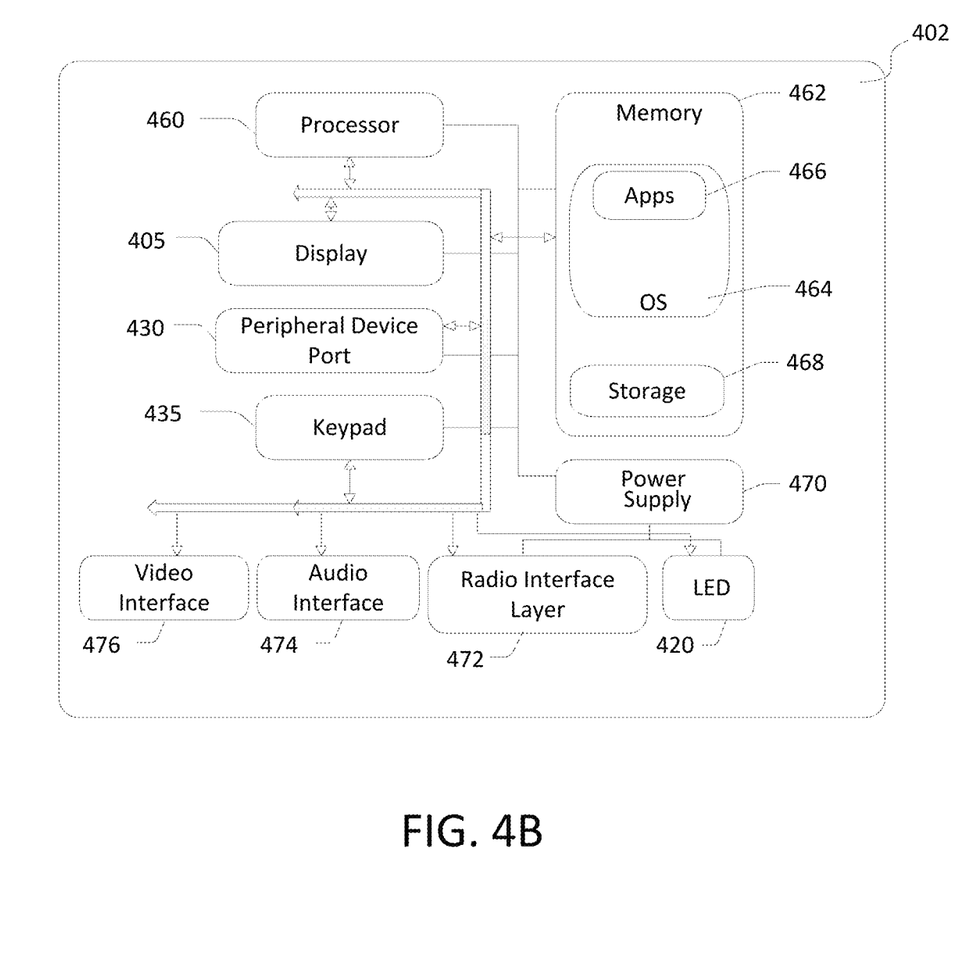
Figure 5:
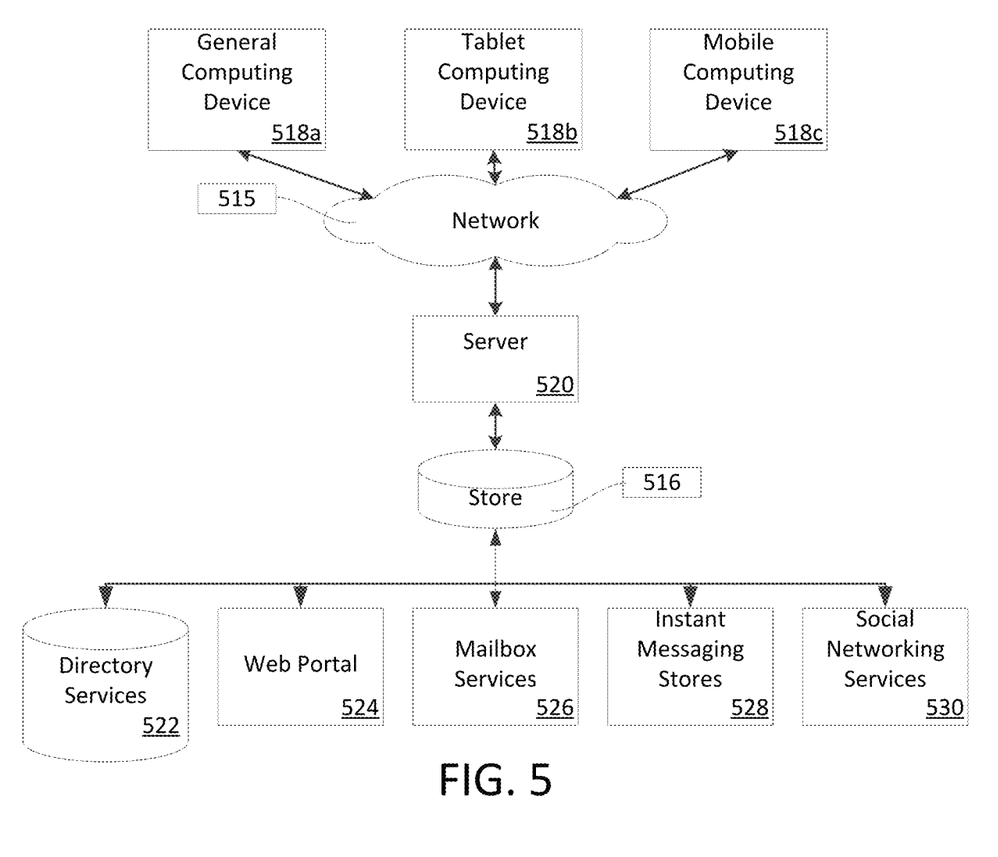
FIG. 5 is a simplified block diagram of a distributed computing system in which aspects of the present disclosure may be practiced.

As an example, method 100 may be executed by an exemplary computing device (or computing devices) and/or system such as those shown in FIGS. 3-5. Operations performed in method 100 may correspond to operations executed by a system and/or service that execute computer programs, application programming interfaces (APIs), neural networks or machine-learning processing and semantic and entity understanding modeling, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. In one instance, processing operations described in method 100 may be implemented by one or more components connected over a distributed network.

Method 100 begins at processing operation 102, where a digital document is presented through an exemplary application/service. Presentation (processing operation 102) of an exemplary digital document may occur through a user interface of an application/service that is executing on a computing device. Presentation of a digital document (or multiple digital documents) is intended to comprise instances where: 1) a digital document is being accessed through an application/service; 2) a training mode for trial presentation of a digital document is executing through an application/service; and 3) a digital document is being presented in a presentation mode through an application/service. A digital document may comprise but is not limited to: a website, an electronic file/document such as: a word document, a notes document, a spreadsheet document, a webpage and a digital presentation document, among other non-limiting examples. Examples of digital documents comprise any digital file that is used to generate viewable content when accessed by a computing device (executing an application/service). As referenced above, one example of a digital document is a digital presentation document. An exemplary digital presentation document includes slide-based presentations (e.g., PowerPoint® presentation, presentation deck). Other examples of digital presentation document include arranged or grouped content including: digital notecard items, image content (e.g., arranged in an image gallery), video content and grouped/threaded message content, among other examples.

An example of an application/service is a productivity application/service. An exemplary productivity application/service is an application/service configured for execution to enable users to complete tasks on a computing device (e.g., presentation of one or more digital documents), where exemplary productivity services may be configured for presentation of digital documents as well as automated presentation (flow) control of a digital document. This may occur in coordination with the user interface of exemplary productivity services that may be adapted for automated presentation control. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant services, directory applications/services, mapping services, calendaring services, electronic payment services, digital storage applications/services and social networking applications/services, among other examples. In some examples, an exemplary productivity application/service may be a component of a suite of productivity applications/services that may be configured to interface with other applications/services associated with a platform. For example, a word processing service may be included in a bundled service (e.g. Microsoft® Office365® or the like). Further, an exemplary productivity service may be configured to interface with other Internet sources/services including third-party application/services, for example, to enhance functionality of the productivity service.

In some examples, processing of method 100 may proceed to processing operation 104, where training for presentation of a digital document is executed. As referenced in the foregoing description, examples described herein include those in which a presentation is being accessed in real-time (or near real-time). In some instances, applications/services may enable a user to execute a training run for presentation of digital document(s), for example, where a training mode may be used to model speech for future presentation of a digital document. This may assist real-time processing of speech signals, where accuracy in probabilistic determinations, as to positional placement during a presentation, is enhanced through analytical processing during training runs for presentation of a digital document. During real-time processing, where a presenter uses similar language, change sentences, skip sentences, etc., natural language processing is able to correlate received speech with that which was previously processed and analyzed during training. In doing so, a language understanding model or natural language model may be implemented to execute language understanding processing and correlation of received speech signals. Exemplary language understanding processing (including the implementation of a language understanding model/natural language model) are known to one skilled in the field of art.

The present disclosure, in execution of training or a live presentation of a digital document (e.g., without training) further discloses implementing a machine-learning based service to build natural language understanding into applications/services for evaluation of digital documents during a presentation. Among other examples, a machine-learning model (or neural network model, among other examples) may be adapted for comparison of a context of received speech signals with contextual data associated with a digital document. In doing so, the machine-learning model is configured to extract meaning from speech signals (including slot-based data analysis (e.g., slot tagging) as known to one skilled in the field of art). Analysis of speech signals, in view of contextual data associated with digital documents, is used to generate probabilistic scoring for determination of placement positioning for automated update of a digital document. Generated probabilistic scoring may be utilized for determination of a current placement position within a presentation of a digital document and subsequent placement positions for automatic update of a presentation of a digital document. Contextual analysis and probabilistic evaluation of analyzed data for determining a next placement position in a presentation is among the novel technical advantages of the present disclosure. As referenced in the foregoing, an exemplary language understanding model may be employed by a language understanding service that is separate from an exemplary productivity or where functionality is natively integrated into a productivity service.

Subsequent placement positions for presentation of a digital document may be linear updates (e.g., a previously ordered slide or a next ordered slide) or non-linear updates (e.g., an order of slides within a digital document is not followed), where contextual analysis of speech signals in comparison with contextual data associated with a digital document determines a next placement position for automatic update of a presentation. Contextual data may comprise but is not limited to: timestamp data, keywords or voice commands, metadata associated with a digital presentation document, content of the digital presentation document including notes/note items associated with portions of the digital document, categorical classifications and entity data and signal data collected from an interaction with a user interface (e.g., positioning of a mouse device or pointer), among other examples. Contextual data may be collected from any of a number of data sources including from an executing application/service (e.g., productivity service that is presenting a digital document), parsing of data (and metadata) associated with a digital document, cross-application/service interaction with platform services including knowledge repositories, log data (including click log data), entity relationship databases, voice command libraries, automatic speech recognition modeling, etc. As referenced above, language understanding processing as well as user interface features for automated presentation control (including toggling of training and live presentations mode) may be natively integrated within applications/services that are used to access digital documents. In some instances, processing operations described herein for speech recognition (e.g., converting speech to text) and/or a ranker for generating probabilistic scoring for determination of a placement position in a presentation of a digital document may occur using a distributed network service (e.g., cloud-based service), where functionality of different services associated with a platform provider (e.g., Microsoft®, Google®, Apple®, IBM®) may be utilized (or integrated) to enhance processing and productivity.

In one example, a user interface of an exemplary application/service may be configured to enable a user to enter a training mode for speech recognition training during presentation of a digital document. For instance, a user interface of an exemplary productivity service may be configured to enable a user to select a user interface feature to trigger entry into a training mode (e.g., to execute a trial run of the presentation). An exemplary training mode is a mode of an exemplary application/service that enables presentation of a digital document for the purpose of generating trained speech to enhance subsequent analysis of speech signals during a live presentation. In another example, a separate application/service, from the application/service that is being used to view the digital document, may be configured to implement a language understanding model that is trained for presentation-specific contextual analysis. In such an example, the application/service, implementing the language understanding model, may integrate with an application/service that is being used to view the digital document, for example, to enable commands for automated presentation control on behalf of a user.

Further, as training runs likely occur well before actual presentation of a digital document, collection of data from a training run may be further analyzed through interfacing of other platform applications/services, third-party applications/services, etc., to enhance subsequent real-time processing. Presenters, that are formally presenting a digital document (or documents), may wish to execute a training run of a presentation to assist with a future live presentation of a digital document. An exemplary language understanding model may be trained to understand speech signals through the evaluation of prosodic and lexical analysis of speech signals as well as evaluation of other signal data (e.g., device clicks, mouse clicks during a presentation, notes/keywords entered during training). Exemplary language understanding analysis including evaluation of speech signals through lexical and prosodic evaluation is known to one skilled in the field of art. In one instance, a training run may identify characteristics of specific presenters (e.g., parsing, slot tagging, part of speech recognition, word and sentence structuring, semantic analysis, number of speakers, tone, connotation, gender identification), which may be useful for executing probabilistic determinations during real-time subsequent presentation. As an example, a speaker may be presenting to a large audience where audience members may be asking questions that registers as speech signals. In such an example, prior training data enables a language understanding model to factor in the prior training speech to detect that positional placement of a digital document should not be changed because the presenter is not leading the presentation at that point in time. In other examples, a language understanding model may be configured to evaluate any type of speech signal for (whether it is from a presenter identified in the training or another speaker) for automated flow control of a presentation.

Execution of training (processing operation 104) for presentation of a digital document comprises execution of the same processing operations as subsequently described in method 100. Exemplary processing operations comprise: detection of speech signals, conversion of the detected speech signals to text, contextual analysis of the converted text and probabilistic scoring generated for subsequent positional placement. Examples of processing during training for presentation of a digital document is further provided in the description of FIG. 2A. In examples, training runs may be used to identify timestamp data associated with presentation of specific portions of content (e.g., slides) of a digital document (or usage of different digital documents). For instance, a presenter may enter a device action (e.g., mouse click) to change slides of a slide-based presentation, where training is used to identify timestamp data between device actions to identify specific slides and speech signals describing specific slides. In this way, specific words, sentences, actions, etc., may be associated with specific slides, which can be used as a basis for training an exemplary language understanding model for subsequent presentation.

Furthermore, in some examples, execution of training (processing operation 104) may further comprise automatic update of a placement position during a presentation of a digital document. For instance, a presenter may execute multiple training runs, where a second training run may enable a trained language understanding model to automatically adjust a presentation based on results of exemplary probabilistic scoring for automated flow control of a presentation. Moreover, an exemplary language understanding may learn from corrections made by presenters during execution of a training run. For example, a presenter may provide action, through a user interface, that corrects an automated update to a presentation, which can be used to train the language understanding model for evaluation during subsequent processing.

Whether or not training for presentation of digital document has been executed, flow of method 100 may proceed to processing operation 106, where a current placement position is detected in a digital document for real-time evaluation of a presentation of the digital document. A current placement position is a point of reference indicating a position in a digital document that a presentation is currently referencing. In one example, a current placement position is an initial placement position, which is a point in which a presentation of the digital document is accessed. The initial placement position of a digital document may be determined through signal data indicated by an exemplary application/service (e.g., productivity service), for example, when a digital document is launched or a presentation mode (of an application/service) is entered for digital presentation of the digital document (or digital documents). As referenced in the foregoing, examples described herein may reference a training mode as well as a presentation mode (e.g., live presentation mode). In either example, processing operations are similar, but executing training of a presentation may lead to greater accuracy, precision and processing efficiency for a subsequent presentation of a digital document through trained speech processing. A live presentation mode (or live presentation mode) is any real-time presentation of a digital document outside of that in which a training mode is operating.

Timestamp data may be associated with a current placement position, which may be used to provide specific points of reference for speech signals as well as signal data received from exemplary applications/services and computing devices (e.g., actions, pointer references of electronic devices/accessories associated with a computing device). As referenced above, timestamp data from speech signals analyzed during training may be aligned with timestamp data from a real-time (live) presentation, subsequent training run, etc., to detect a context for the presentation of the digital document. Detection (processing operation 106) of a current placement position may occur continuously, where an exemplary language understanding model is applied and configured to continuously check a current placement position of a presentation, which may change at any point in time. In some examples, training data may be utilized to enhance probabilistic determinations as to a next placement position, for example, based on previous trial runs of current placement positioning/initial placement positioning. Moreover, detection of a current placement position is a point of reference for automated update of a presentation, where an application/service may keep track of placement positions during a presentation. In one example, a current placement position is moved to a next placement position, where a presenter may recite a voice command to return to a previous slide (or last placement position). In this way, processing efficiency is achieved for flow control of a presentation of a digital document.

During presentation of a digital document, flow of method 100 may proceed to processing operation 108, where speech signals are detected and converted to text for subsequent processing. As referenced above, an exemplary language understanding model may be implemented to execute speech recognition processing. An exemplary language understanding model may be integrated within an exemplary application/service (e.g., productivity service) or an application/service may interface (e.g., through an API or other programming) to receive results of speech recognition processing. As an example, an exemplary language understanding model may be a cloud-based machine-learning model that is accessible, over a network connection, by a plurality of application/services of a platform. An exemplary language understanding model may be further configured for contextual analysis of speech for selection of a next placement position of in a digital presentation of a digital document.

During presentation of a digital document, speech signals may be detected continuously. As described in the foregoing, speech detection may occur when a presentation mode (or training mode) for digital presentation is entered via an application/service. In alternative examples, speech recognition processing may occur at any point in time and does not require entry to a presentation mode or training mode for speech recognition processing to occur. Processing operation 108 converts received speech signals to text and propagates the converted text for contextual analysis to match the converted speech with contextual data associated with a digital document.

At processing operation 110, the converted text is contextually analyzed. Processing operation 110 comprises matching the text with contextual data associated with the digital document. As referenced in the foregoing description, a machine-learning model (e.g., language understanding model) may be trained to correlate converted speech text with exemplary contextual data associated with a digital document. Contextual data may comprise but is not limited to: timestamp data, keywords or voice commands, metadata associated with a digital presentation document, content of the digital presentation document including notes/note items associated with portions of the digital document, categorical classification and entity data analysis and signal data collected from an interaction with a user interface (e.g., positioning of a mouse device or pointer), among other examples. Contextual data may be collected from any of a number of data sources including from an executing application/service (e.g., productivity service that is presenting a digital document), parsing of data (and metadata) associated with a digital document, cross-application/service interaction with platform services including knowledge repositories, log data (including click log data), entity relationship databases, voice command libraries, automatic speech recognition modeling, etc.

In examples where trained speech has been received for presentation of a digital document, the trained speech may be used as a primary form of contextual data to match with converted text (received in real-time). For instance, probabilistic scoring for matching converted text (of a speech signal) with contextual data of a digital document may comprise evaluation of the trained speech in additional to other contextual data (e.g., specific context portions of the digital document, metadata of the digital document, signal data received from an application/service, computing device). In examples where no trained speech is received for presentation of a digital document (e.g., the presentation is live immediately), contextual data analysis may comprise: evaluation of specific content portions of a digital document; notes associated with a digital document (e.g., notes/keywords associated with specific slides); categorical classification of speech; signal data (received from an application/service and/or computing device); and pre-processed voice commands, among other examples.

Flow may proceed to processing operation 112, where probabilistic scoring is generated for determination of a next placement position of a presentation (within the digital document or another digital document). An exemplary next placement position is a portion of content of the digital document in which a focus of the digital document may be re-located. Selection (processing operation 114) of a next placement position comprises a probabilistic determination that scores a matching of the converted speech text with content of the digital document. In doing so, an exemplary language understanding model is configured to generate a score/rank that correlates a specific portion of a digital document with the converted speech text. This occurs based on machine-learning processing that contextually analyzes the converted text relative to content of a digital document (or digital documents). An exemplary language understanding model may be trained for optimizing probabilistic scoring. Machine-learning processing including ranking/scoring processing is known to one skilled in the field of art. To enhance accuracy and precision of scoring processing, an exemplary language understanding model may be trained. Training of an exemplary machine-learning modeling for probabilistic scoring may depend on offline execution of processing operations described in method 100 that comprise detection and evaluation of speech signals and matching of exemplary contextual data with converted speech text from speech recognition processing. In at least one example, a weighting is applied to specific types of contextual data, where some types of contextual data (e.g., content on a slide) may be given more weight than, for example, signal data received from an application/service. Weighted evaluation of contextual data may be used to identify probability scoring for matching the converted text with a specific portion (e.g., slide) of a digital document.

As an example, a presented may be leading a slide-based digital presentation on a marketing strategy, where a presenter is on a first slide and begins speaking about content on a topic (e.g., client demographics) that is three slides later in an ordering of a slide deck for the digital presentation. An exemplary language understanding model is configured to score/rank the likelihood that the presenter is referencing content of a different portion of the digital document. In the provided example, the language understanding model may detect that the presenter is speaking about marketing to age demographics and match that to content on a slide that comprises a graphical representation of age demographics for marketing of a product. Probabilistic scoring may be based on threshold evaluation relating to how well the converted text matches to content portions (of a digital document). For instance, if a determined probability that a presenter is referencing specific content (e.g., slide) is higher than a predetermined threshold amount, then that specific content is selected as the next placement position for automated update of a digital presentation. Predetermined thresholds may vary without departing from the spirit of the present disclosure.

A next placement position may be selected (processing operation 114) based on the generated probability scoring. As an example, an exemplary language understanding model may select a highest scoring selection that exceeds the predetermined threshold for matching the converted text with contextual data associated with a digital document. Selection of an exemplary placement position may further comprise propagating data that enables an application/service to identify a point in which a digital document is to be updated. For example, in a slide-based presentation, data such as slide numbers, slide titles, etc. may be propagated to assist an application/service with identification of selected placement position. As indicated in the foregoing description, next placement positions for presentation of a digital document may be linear updates (e.g., a previously ordered slide or a next ordered slide) or non-linear updates (e.g., an order of slides within a digital document is not followed), where contextual analysis of speech signals in comparison with contextual data associated with a digital document determines a next placement position for automatic update of a presentation.

Flow of method 100 may proceed to processing operation 116, where a display of a digital document is automatically updated to the selected next placement position. Processing operation 116 comprises automatically updating, through a user interface of an application/service, display of the digital document on behalf of a user without requiring manual action by the user. In examples where an update command is being sent to an application/service (e.g., productivity service) from an application/service that is configured for automated presentation control, method 116 may further comprise correspondence where applications/services interface to enable an exemplary productivity service to automatically update display of a digital document based on received update commands. An exemplary update command may comprise indication of a selected next position as well as instruction for the application/service to update the display of the digital document (e.g., digital presentation). In other instances, an application/service is configured to natively update a presentation of a digital document based on a selection of a next placement position.

Flow of method 100 may proceed to decision operation 118, where it is determined whether a correction is to occur to an automated update of a digital document. In examples where no correction is received, flow of decision operation 118 branches NO and processing of method 100 returns to processing operation 108, where subsequent speech signals are detected and converted. In examples where a correction to an automatic update of the digital document is needed, flow of decision operation 118 branches YES and processing proceeds to processing operation 120. At processing operation 120, a manual update is received for presentation of the digital document. In some cases, an automatic update may not be correct or not what a presenter desired. Processing operation 120 comprises manual correction of a placement of a digital document by a presenter. For instance, a presenter may utilize an electronic device (e.g., presentation clicker, mouse, stylus) or touch input to adjust presentation of a digital document. In other examples, a presenter may use voice commands to do so. In any example, an exemplary language understanding model may learn from corrections including the detection of speech that indicates an automated update was erroneous. In examples where a correction is received, flow of method 100 returns to processing operation 108, where subsequent speech signals are detected and converted.

Figure 2A:
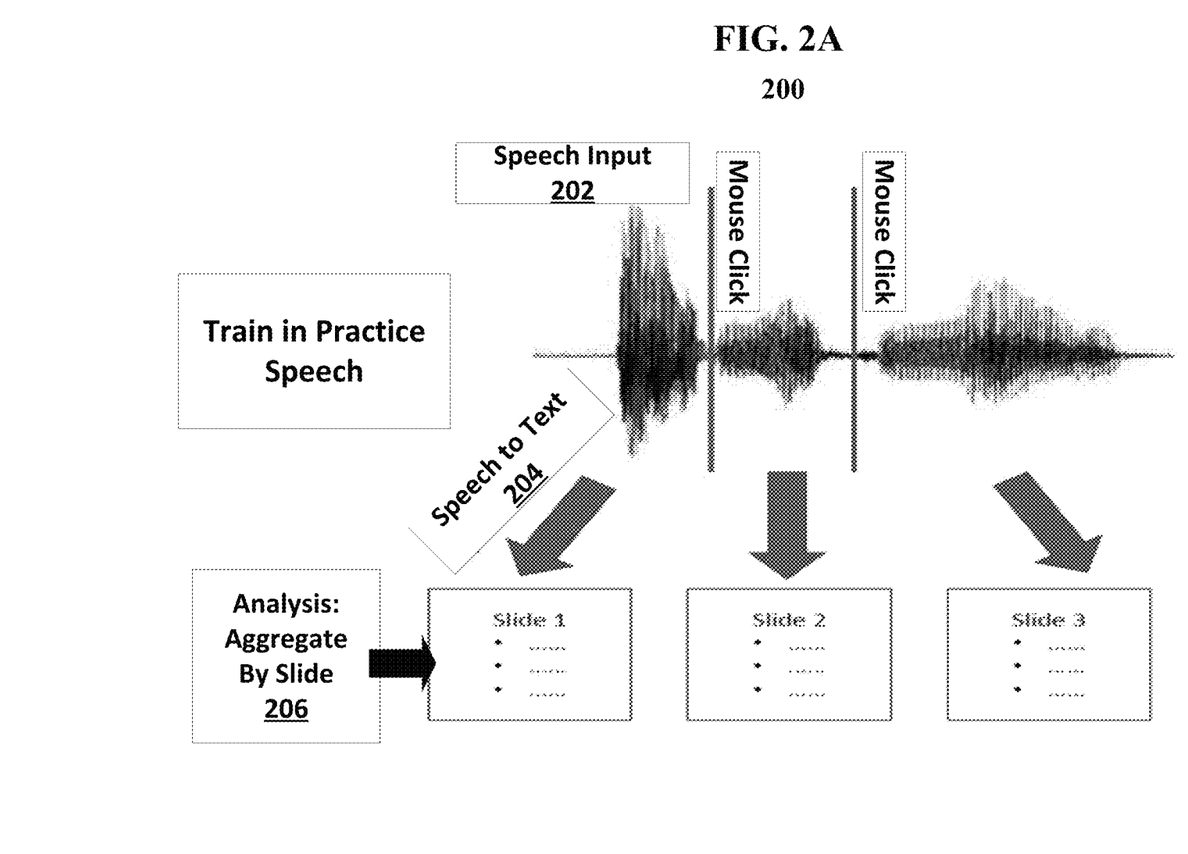
FIG. 2A illustrates an exemplary process flow for speech to text processing in a training scenario, with which aspects of the present disclosure may be practiced.
Figure 2B:
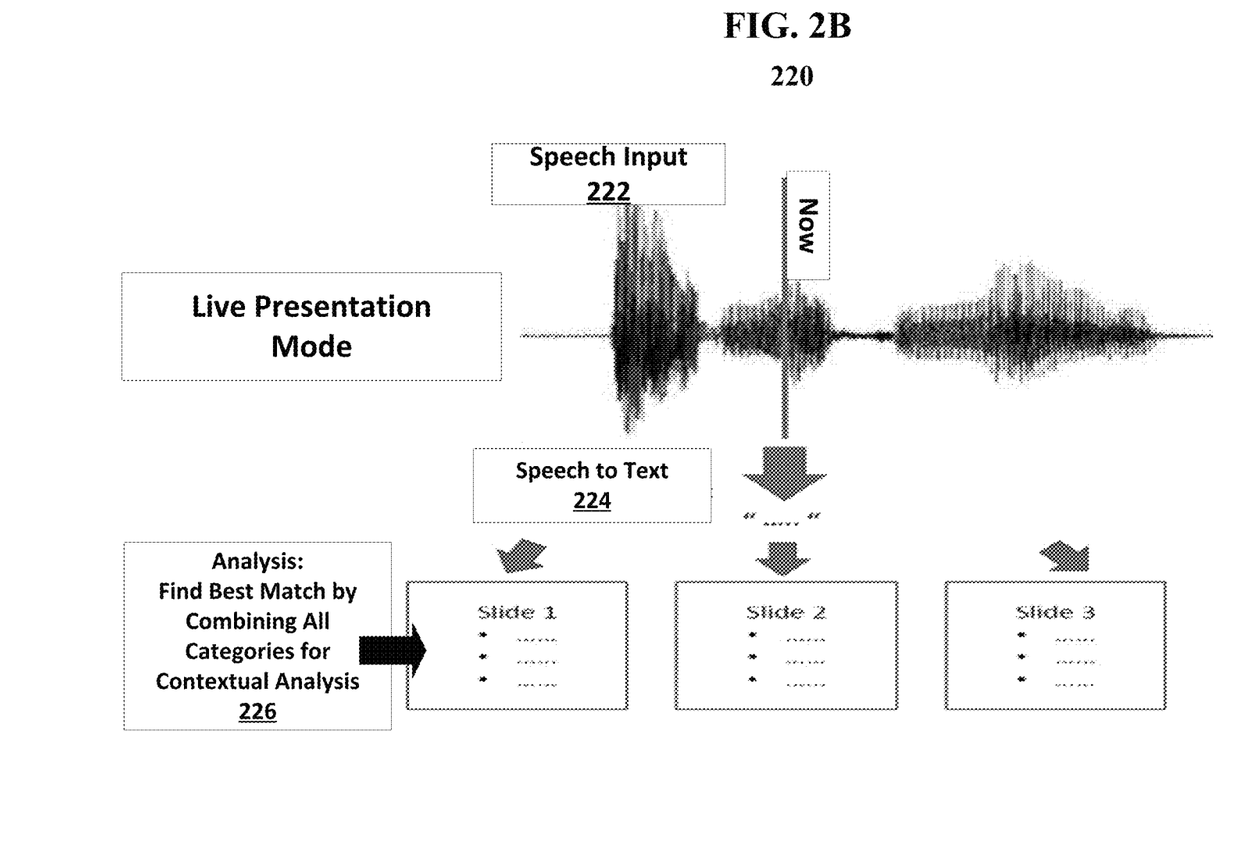
FIG. 2B illustrates an exemplary process flow for speech to text processing in a live presentation mode scenario, with which aspects of the present disclosure may be practiced.

FIGS. 2A-2B illustrate exemplary process flows of processing operations described in the foregoing description including method 100 (FIG. 1).

FIG. 2A illustrates an exemplary process flow 200 for speech to text processing in a training scenario where trained speech is generated for subsequent live presentation of a digital document. As referenced in the foregoing description, some processing examples may occur where a presenter has executed training runs of a presentation. In such instances, trained speech may be utilized to assist with contextual evaluation of a live presentation of a digital document.

In process flow 200, speech input 202 is received for processing. As illustrated in process flow 200, training of speech input 202 may comprise evaluation of spoken utterances (speech signals) between device clicks (e.g., "mouse click"), which provides indication of a presenter speaking about specific portions of a digital document while navigating a digital presentation. An exemplary language understanding model may be used for speech recognition processing and analysis. For instance, a user may click to a next slide of a presentation and begin speaking about that slide. When a next device click is received to proceed to another slide, an exemplary language understanding model may note timestamps associated with the device clicks to identify specific speech that pertains to a particular slide. Signal data associated with device clicks (actions) may assist with correlation of specific content of a digital document (e.g., slides) with speech received from a presenter. For instance, an application/service may identify points of reference within a presentation (e.g., slide numbers, page numbers, etc.) that may assist with confirming a point in a digital document that a presenter is referencing. As described in method 100, received speech signals are converted 204 to text. The converted text is analyzed 206, where the converted text is associated with specific portions of a digital document. For instance, an analysis 206 may comprise aggregating the converting on a slide-by-slide basis. This enables trained speech to be created for specific portions (e.g., slides) of a digital document. The trained speech may then be utilized to assist with contextual analysis of speech signals received during a live presentation of a digital document.

FIG. 2B illustrates an exemplary process flow 220 for speech to text processing in a live presentation mode scenario, with which aspects of the present disclosure may be practiced. As referenced in the foregoing description, a live presentation mode is an instance where no trained speech has been generated for a presentation of a digital document. In a live presentation mode example, speech input is received 222. Unlike some instances where a presenter is training a machine learning model for generation of trained speech to assist with subsequent analysis, a live presentation mode may be focused on strictly on the speech signals received. An exemplary language understanding model may be used for speech recognition processing and analysis, for example, during a presentation of a digital document. The speech input 222 is converted 224 to text to assist with subsequent contextual analysis. At processing operation 226, the converted text is then analyzed to match with content associated with a specific portion (e.g., slide) of a digital document. In doing so, an analysis 226 comprises finding a best matching slide for the converted text by combining different contextual aspects of analysis (e.g., combining processing results from a plurality of different categories of contextual analysis), as described in method 100 (FIG. 1). An exemplary next placement position is selected for automated update of a presentation based on results of probabilistic scoring that accounts for the contextual analysis.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for automated presentation control as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured for automated presentation control as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured for automated presentation control as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
presenting, in a user interface, a digital document;
converting a speech signal to text;
evaluating the text relative to contextual data associated with the digital document, wherein the evaluating correlates the text with the contextual data that comprises:
analyzed data for content portions of the digital document, and
training data collected during a training run of a presentation of the digital document that occurred prior to the presenting of the digital document, wherein the training data collectively comprises data corresponding with prior recorded user speech during the training run and signal data pertaining to device action during the training run;
generating probability scoring for determination of a next placement position in the digital document by applying trained machine learning modeling that generates the probability scoring, indicating a likelihood that a presenter is referring to a specific portion of the digital document, based on an evaluation that comprises a correlation between the text and the contextual data;
selecting the specific portion of the digital document as the next placement position in the digital document based on a result of the probability scoring; and automatically updating, through the user interface, a display of the digital document to the next placement position that is selected.

2. The method of claim 1, wherein the digital document is a slide-based presentation, wherein the analyzed data for content portions of the digital document is data associated with slides of the slide-based presentation, and wherein the selected next placement position is a different slide of the slide-based presentation.

3. A system comprising:
at least one processor; and
a memory, operatively connected with the at least one processor, storing computer-executable instructions that, when executed by the at least one processor, causes the at least one processor to execute a method that comprises:
presenting, in a user interface, a digital document;
converting a speech signal to text;
evaluating the text relative to contextual data associated with the digital document, wherein the evaluating correlates the text with the contextual data that comprises:
analyzed data for content portions of the digital document, and
training data collected during a training run of a presentation of the digital document that occurred prior to the presenting of the digital document, wherein the training data collectively comprises data corresponding with prior recorded user speech during the training run and signal data pertaining to device action during the training run;
generating probability scoring for determination of a next placement position in the digital document by applying trained machine learning modeling that generates the probability scoring, indicating a likelihood that a presenter is referring to a specific portion of the digital document, based on an evaluation that comprises a correlation between the text and the contextual data;
selecting the specific portion of the digital document as the next placement position in the digital document based on a result of the probability scoring; and
automatically updating, through the user interface, a display of the digital document to the next placement position that is selected.

4. The system of claim 3, wherein the digital document is a slide-based presentation, wherein the analyzed data for content portions of the digital document is data associated with slides of the slide-based presentation, and wherein the selected next placement position is a different slide of the slide-based presentation.

5. A computer-readable storage medium storing computer-executable instructions that, when executed by at least one processor, causes the at least one processor to execute a method comprising:
presenting, in a user interface, a digital document;
converting a speech signal to text;
evaluating the text relative to contextual data associated with the digital document, wherein the evaluating correlates the text with the contextual data that comprises:
analyzed data for content portions of the digital document, and
training data collected during a training run of a presentation of the digital document that occurred prior to the presenting of the digital document, wherein the training data collectively comprises data corresponding with prior recorded user speech during the training run and signal data pertaining to device action during the training run;
generating probability scoring for determination of a next placement position in the digital document by applying trained machine learning modeling that generates the probability scoring, indicating a likelihood that a presenter is referring to a specific portion of the digital document, based on an evaluation that comprises a correlation between the text and the contextual data;
selecting the specific portion of the digital document as the next placement position in the digital document based on a result of the probability scoring; and
automatically updating, through the user interface, a display of the digital document to the next placement position that is selected.

6. The method of claim 1, further comprising: receiving, through the user interface, a selection of a user interface feature that enters the digital document into a training mode for obtaining the prior recorded user speech; and entering the digital document in the training mode based on the receiving of the selection of the user interface feature, wherein the prior recorded user speech and the signal data pertaining to device action are collected while the digital document is in the training mode.

7. The method of claim 1, further comprising: executing the training run, prior to the presenting of the digital document, that comprises user speech associated with the digital document; recording the user speech, as the prior recorded user speech; and propagating the prior recorded user speech to the machine learning modeling for evaluating the context data.

8. The system of claim 3, wherein the method, executed by the at least one processor, further comprises: receiving, through the user interface, a selection of a user interface feature that enters the digital document into a training mode for obtaining the prior recorded user speech; and entering the digital document in the training mode based on the receiving of the selection of the user interface feature, wherein the prior recorded user speech and the signal data pertaining to device action are collected while the digital document is in the training mode.

9. The system of claim 3, wherein the method, executed by the at least one processor, further comprises: executing the training run, prior to the presenting of the digital document, that comprises user speech associated with the digital document; recording the user speech, as the prior recorded user speech; and propagating the prior recorded user speech to the machine learning modeling for evaluating the context data.

10. The computer-readable storage medium of claim 5, wherein the method, executed by the at least one processor, further comprising: receiving, through the user interface, a selection of a user interface feature that enters the digital document into a training mode for obtaining the prior recorded user speech; and entering the digital document in the training mode based on the receiving of the selection of the user interface feature, wherein the prior recorded user speech and the signal data pertaining to device action are collected while the digital document is in the training mode.

11. The computer-readable storage medium of claim 5, wherein the method, executed by the at least one processor, further comprising: executing the training run, prior to the presenting of the digital document, that comprises user speech associated with the digital document; recording the user speech, as the prior recorded user speech; and propagating the prior recorded user speech to the machine learning modeling for evaluating the context data.

12. The method of claim 1, wherein a correlation of the text with the contextual data comprises:
 identifying two or more timestamps associated with device actions received via a computing device during the training run of the presentation of the digital document,
 identifying specific user speech occurring between the two or more timestamps associated with the device actions, and wherein the generating of the probability scoring generates scoring based on a correlation between the text and text associated with the specific user speech occurring between the two or more timestamps.

13. The method of claim 1, wherein the signal data pertaining to device action is identified from an evaluation of acoustic features of audio signals collected during the training run of the presentation of the digital document.

14. The method of claim 1, wherein the evaluation, used to generate the probability scoring, further comprises a correlation indicating a likelihood that the speech signal is coming from the presenter of the digital document based on a comparison of lexical and prosodic features between the speech signal and the prior recorded user speech.

15. The system of claim 3, wherein a correlation of the text with the contextual data comprises:
 identifying two or more timestamps associated with device actions received via a computing device during the training run of the presentation of the digital document,
 identifying specific user speech occurring between the two or more timestamps associated with the device actions, and wherein the generating of the probability scoring generates scoring based on a correlation between the text and text associated with the specific user speech occurring between the two or more timestamps.

16. The system of claim 3, wherein the signal data pertaining to device action is identified from an evaluation of acoustic features of audio signals collected during the training run of the presentation of the digital document.

17. The system of claim 3, wherein the evaluation, used to generate the probability scoring, further comprises a correlation indicating a likelihood that the speech signal is coming from the presenter of the digital document based on a comparison of lexical and prosodic features between the speech signal and the prior recorded user speech.

18. The computer-readable storage medium of claim 5, wherein a correlation of the text with the contextual data comprises:
 identifying two or more timestamps associated with device actions received via a computing device during the training run of the presentation of the digital document,
 identifying specific user speech occurring between the two or more timestamps associated with the device actions, and wherein the generating of the probability scoring generates scoring based on a correlation between the text and text associated with the specific user speech occurring between the two or more timestamps.

19. The computer-readable storage medium of claim 5, wherein the signal data pertaining to device action is identified from an evaluation of acoustic features of audio signals collected during the training run of the presentation of the digital document.

20. The computer-readable storage medium of claim 5, wherein the evaluation, used to generate the probability scoring, further comprises a correlation indicating a likelihood that the speech signal is coming from the presenter of the digital document based on a comparison of lexical and prosodic features between the speech signal and the prior recorded user speech.

* * * * *